(12) United States Patent
Yu (10) Patent No.: US 7,752,249 B2
(45) Date of Patent: Jul. 6, 2010

(54) MEMORY-BASED FAST FOURIER TRANSFORM DEVICE

(75) Inventor: Chi-Li Yu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 1345 days.

(21) Appl. No.: 11/213,835

(22) Filed: Aug. 30, 2005

(65) Prior Publication Data

US 2006/0253514 A1    Nov. 9, 2006

(30) Foreign Application Priority Data

May 5, 2005    (TW)    .............................. 94114509 A (51) Int. Cl.
*G06F 15/00* (2006.01)
*G06F 12/00* (2006.01)
*G06F 12/06* (2006.01)
*G11C 8/00* (2006.01)

(52) U.S. Cl. ................. 708/404; 708/403; 708/405; 708/406; 708/408; 711/5; 365/230.01; 365/230.03

(58) Field of Classification Search ......... 708/403–409; 711/1, 5, 104–105, 147–173, 202, 211
See application file for complete search history.

(56) References Cited

U.S. PATENT DOCUMENTS 3,871,577 A * 3/1975 Avellar et al. ............... 708/404
4,893,279 A * 1/1990 Rahman et al. ......... 365/230.03
5,091,875 A     2/1992 Wong et al.
5,163,017 A * 11/1992 Wong et al. ................. 708/406
5,946,293 A * 8/1999 Beale et al. ................. 370/210
6,356,926 B1 * 3/2002 Andre ........................ 708/404
6,401,162 B1 * 6/2002 Nasserbakht ................. 711/5
6,751,642 B1 * 6/2004 Cambonie et al. ........... 708/404
6,845,423 B2 * 1/2005 Park ............................. 711/5
7,007,056 B2 * 2/2006 Ryu ........................... 708/404
7,164,723 B2 * 1/2007 Sunwoo ...................... 375/260
7,496,618 B2 * 2/2009 Brown et al. ................ 708/404
2003/0172245 A1* 9/2003 Takala ......................... 711/220
2004/0243656 A1* 12/2004 Sung et al. .................. 708/404

OTHER PUBLICATIONS

L.G. Johnson, "Conflict free memory addressing for dedicated FFT hardware," IEEE Transactions on Circuits and Systems II: Analog and Digital Signal Processing, vol. 39, No. 5, pp. 312-316, May 1992.*

(Continued)

*Primary Examiner*—Chat C Do
*Assistant Examiner*—Matthew Sandifer
(74) *Attorney, Agent, or Firm*—Bacon & Thomas, PLLC (57) ABSTRACT

A memory-based Fast Fourier Transform device is provided, which adopts single-port random access memory (RAM), rather than dual-port RAM, as a storage, and the circuit area of the FFT device is therefore reduced. In order to enhance the access efficiency of the memory and the use efficiency of a processor, the transformer adopts a modified in-place conflict-free addressing to achieve similar performance of a traditional Fast Fourier Transform device.

11 Claims, 10 Drawing Sheets

OTHER PUBLICATIONS

Cheng-Han Sung; Kun-Bin Lee; Chein-Wei Jen, "Design and implementation of a scalable fast Fourier transform core," IEEE Asia-Pacific Conference on ASIC, pp. 295-298, 2002.*

Y. Chang and S.-C. Park, "An enhanced memory assignment scheme for memory-based FFT processor", IEICE Trans. Fundamentals, vol. E87-A, No. 11, pp. 3020-3024, Nov. 2004.*

Baek, J.H.; Son, B.S.; Jo, B.G.; Sunwoo, M.H.; Oh, S.K., "A continuous flow mixed-radix FFT architecture with an in-place algorithm," Proceedings of the 2003 International Symposium on Circuits and Systems, vol. 2, pp. II-133-II-136, May 2003.*

L. G. Johnson; *Conflict Free Memory Addressing for Dedicated FFT Hardware;* IEEE Transactions On Circuits And Systems-II; Analog And Digital Signal Processing, vol. 39, No. 5, May 5, 1992; pp. 312-316.

* cited by examiner

MEMORY-BASED FAST FOURIER TRANSFORM DEVICE

BACKGROUND OF THE INVENTION

1. Field of the Invention

The invention relates to a Fast Fourier Transform (FFT) device and, more particularly, to a single-port RAM-based FFT device.

2. Description of Related Art

FFT is a demodulating method commonly used in high-speed communication systems, and its corresponding modulating method is typically known as Inverse Fast Fourier Transform (IFFT). FFT is evolved from Discrete Fourier Transform (DFT). An N-point DFT can be represented by the following equation:

$$X(k) = \sum_{n=0}^{N-1} x(n) W_N^{nk}, \tag{1}$$

$$\text{for } k = 0, 1, \ldots, N-1,$$

$$W_N^{nk} = e^{-j\frac{2\pi nk}{N}}.$$

However, equation (1) obviously implies the problem of high computational complexity to thus be replaced by FFT, which has a merit of lower computational complexity. FFT is widely used in high-speed communication systems. Here, a wide marketing broadband access technology, i.e., Asymmetric Digital Subscriber Line (ADSL), is given as a description of a high-speed communication system. The ADSL technology adopts a Discrete Multi-Tone (DMT) method to perform data modulation/demodulation. The DMT method traditionally divides a communication band into multiple orthogonal sub-channels. A downstream/upstream bandwidth is determined according to the communication quality of each sub-channel. DMT provides the good capability of adaptive data transmission so as to provide a better efficiency on the communication band. DMT adopts IFFT/FFT to perform data modulation/demodulation.

A traditional circuit structure adapted to perform a traditional FFT is similar to that for a traditional IFFT. In this case, the traditional IFFT circuit can be obtained by inversely arranging the traditional FFT circuit appropriately. Since the traditional IFFT circuit is easily obtained by one skilled in the art, the following description focuses on the traditional FFT circuit only.

Figure 1:
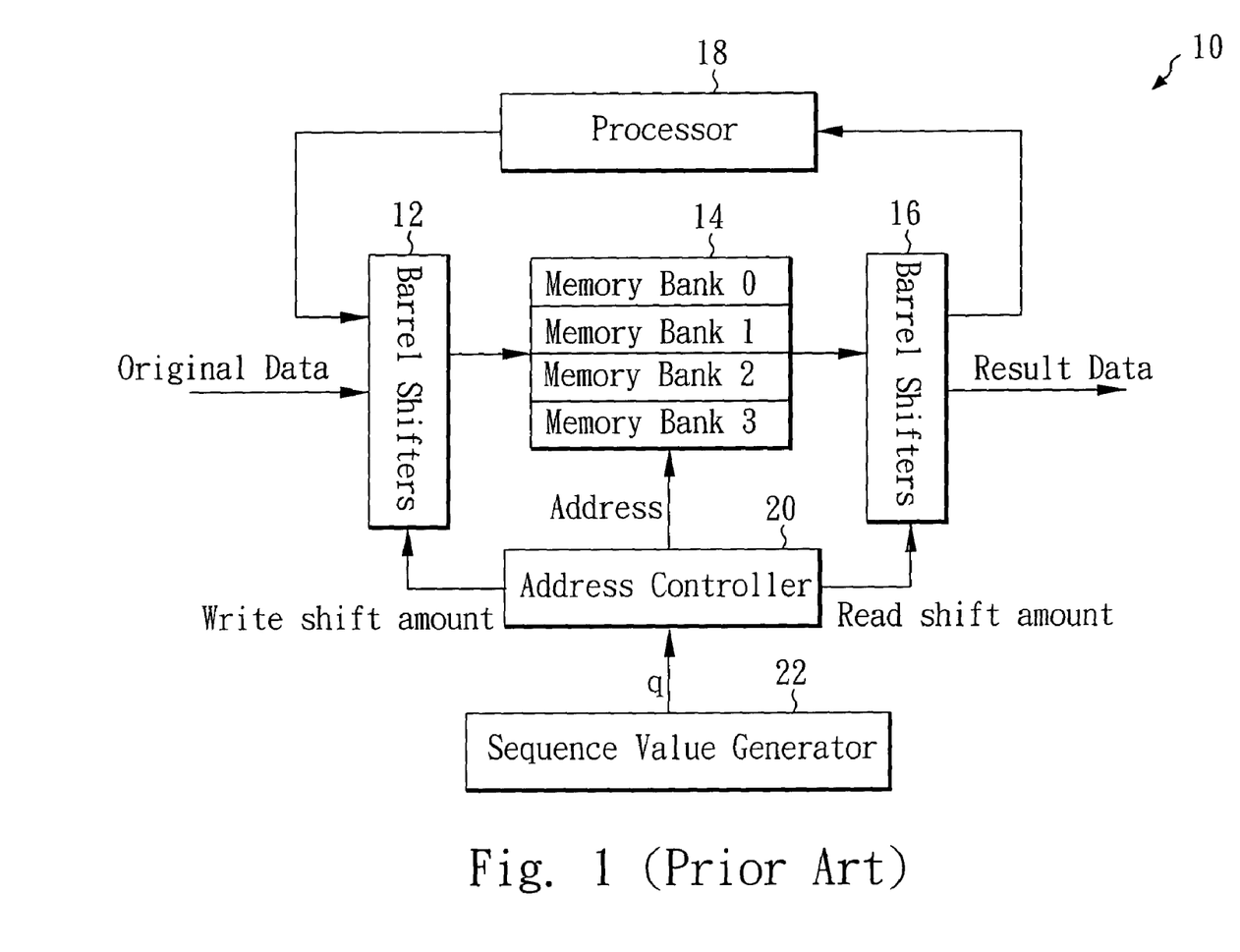
FIG. 1 is a block diagram of a traditional FFT device.

Various methods have been used to implement the traditional FFT circuit. For example, FIG. 1 shows a block diagram of a memory-based FFT device 10. The device 10 essentially includes a traditional memory 14 and processor 18. The data processing is completed by using a traditional address controller 20 to generate address of memory 14, to control the functions of the barrel shifters 12 and 16 according to a sequence value q generated by a sequence value generator 22, and to further control original data to be processed and then output result data. The original data is preferably a complex word containing a real number and an imaginary number.

To simplify the circuit complexity of the traditional FFT device 10, a recursive structure is traditionally used and therefore just one processor 18 needs to be adopted to repeatedly perform the data processing. As a result, the circuit area of the traditional FFT device 10 can be relatively reduced. In addition, the number of data input and output ports of the processor 18 is traditionally a power of 2, i.e., 2, 4, 8 . . . etc., denoted by r. The whole profile of the processor 18 looks like a butterfly and therefore is named the butterfly structure. Such a memory-based structure can enhance the flexibility of the memory 14 because the memory 14 concurrently plays two roles, one is a data buffer as data is input or output, and the other is a data register while the FFT device 10 is in computation status. Because the memory 14 is a RAM and can be accessed randomly, a user can appropriately design an addressing controller 20 to write the data to an appropriate address. Similarly, when the data is output, the addressing controller 20 can sequentially output the data stored in the memory 14.

To minimize the area of the memory 14 and increase the efficiency, the FFT device 10 adapts an "in-place conflict-free" addressing to extend the utility of the memory 14 to 100%. The term "in-place" indicates that data before and after being processed are stored in a same memory address. Accordingly, the capacity of the memory 14 is reduced to the minimum. The term "conflict-free" indicates that when the processor 18 accesses data in the memory 14, one bank of the memory 14 will not be asked to provide two or more data at each time.

Because of using the dual-port RAM devices to form the memory 14, data can be read from and written to the memory 14 concurrently. In addition, the memory 14 can operate with a data shifting function of the barrel shifter 12 to appropriately shift the sequence of data. For example, the sequence of data output from the processor 18 can be shifted by one word so as to be written to the memory 14 correctly. The serial number of data can be assigned by the user, and is preferably sorted by natural order. Based on the foregoing explanation, the abovementioned shifting can provide a similar function to sort the data in natural order.

According to the equation of the in-place conflict-free addressing, an index n of data to be processed is represented by the following equation:

$$n = n_0 \cdot r^{R-1} + n_1 \cdot r^{R-2} + \ldots + n_{R-1} \cdot r^0, \tag{2}$$

A bank index B(n) of the memory 14 is represented by the following equation:

$$B(n) = (n_0 + n_1 + \ldots + n_{R-1}) \bmod r, \tag{3}$$

wherein R is represented by the following equation:

$$R = \log_r N, \tag{4}$$

In addition, an address value A(n) of a cell of a memory bank is represented by the following equation.

$$A(n) = n_1 \cdot r^0 + n_2 \cdot r^1 + \ldots + n_{R-1} \cdot r^{R-2}, \tag{5}$$

Figure 2:
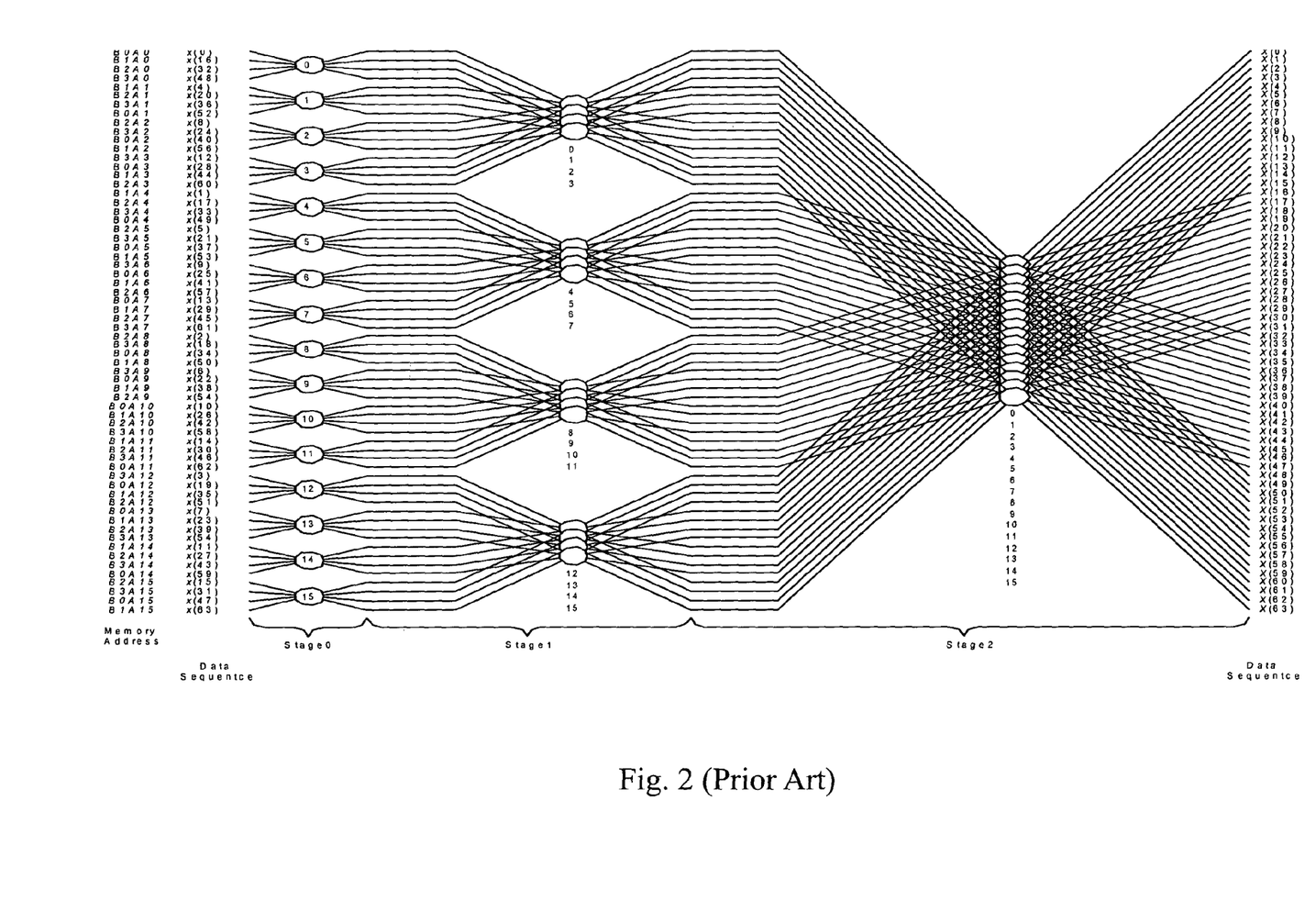
FIG. 2 is a data flow graph of FFT with a processing sequence and operation of FIG. 1.

For example, if N=64, r=4, R=3, the 41th data has the index $n=(221)_4$ at the input terminal, the bank index B(n)=1, and the address value A(n)=6. Accordingly, when the bank index B(n) and the address value A(n) are known, the data can be correctly read from the memory 14 to the input ports of the processor 18 to perform the FFT process, and then the processor 18 can write the processed data to the same memory address in the same memory bank. As shown in FIG. 2, if the amount of data is 64 (N=64), and sorted in natural order, because a dual-port RAM has a feature of random access, the data can be stored in the memory bank randomly upon the principle of the in-place conflict-free addressing. In addition, the processor 18 has four data input ports (n=r=4), and divides the memory 14 into four memory banks, denoted as bank0, bank1, bank2 and bank3. The cells of each bank can output or input data before or after being processed. No matter before or after being processed, the data is stored in the same memory address. Further, no conflict occurs in concurrently storing and fetching r data as a result of using the in-place conflict-free addressing. In the figure, a circle pattern (O) indicates a processor 18, and the number near the circle pattern indicates the sequence of data processing. The 48 times of data processing are divided into three stages (R=3), stage0, stage1 and stage2. Each stage performs 16 times of data processing in a random sequence, but on the purpose of simplifying the design complexity of the address controller 20, a natural sequence is preferable. Next, the address controller 20 outputs a respective address to the memory 14, and outputs read and write shift amounts to the barrel shifters 12 and 16 respectively so as to control the operations thereof. Thus, the shifter 12 and 16 can correctly provide data from the correct memory bank or write data to the correct memory bank. The relation between the sequence value q and the shift amount is shown in the following equations.

$$q = q_{R-2} \cdot r^{R-2} + q_{R-3} \cdot r^{R-3} + \ldots + q_0, \quad (6)$$

$$\text{Shift Amount} = (q_{R-2} + q_{R-3} + \ldots + q_0) \bmod r. \quad (7)$$

Figure 3:
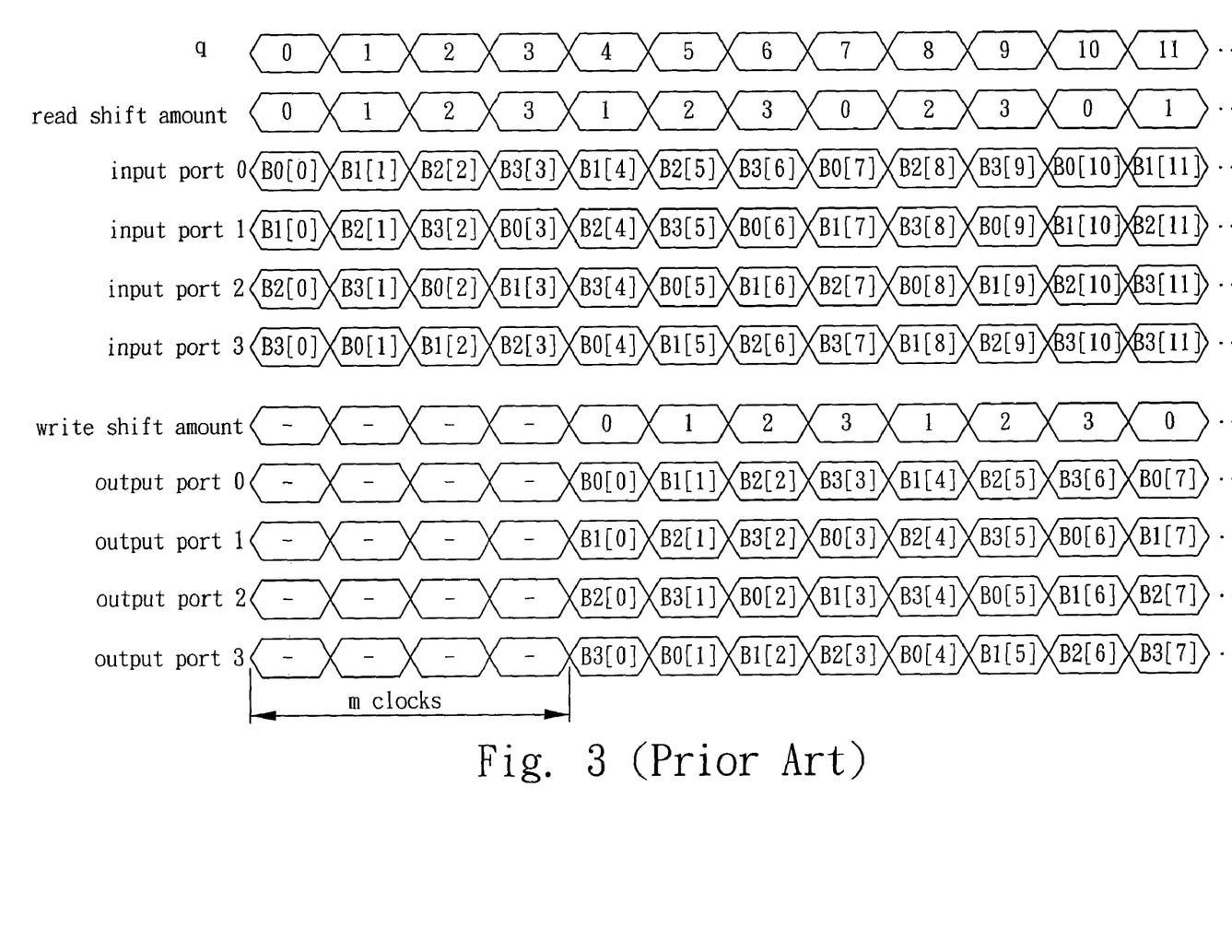
FIG. 3 is a timing diagram of corresponding sequence values, shift amount and memory addresses in the prior art.

As shown in FIG. 3, the read shift amount is the same as the write shift amount, and difference is that the write shift amount is delayed m clocks from the read shift amount, wherein the m clocks preferably equal to the time for performing one data processing. For simplifying the following description, the address value A(n) of the bank index B(n) is denoted as Bn[A(n)]. And, in this case, m=4. When q=0, the butterfly structure reads data at memory addresses B0[0], B1[0], B2[0] and B3[0]. Next, when q=1, the butterfly structure reads data at memory addresses B0[1], B1[1], B2[1] and B3[1] that are shifted by one complex word. Next, when q=2, the butterfly structure reads data at memory addresses B0[2], B1[2], B2[2] and B3[2] that are shifted by two complex words. Next, when q=3, the butterfly structure reads data at memory addresses B0[3], B1[3], B2[3] and B3[3] that are shifted by three complex words. Next, when q=4, the butterfly structure starts to write the processed data back to the memory 14. Accordingly, the time required by the FFT device 10 to complete the whole FFT is represented by the following equation:

$$\left(\frac{N}{r} \cdot \log_r N\right) + m. \quad (8)$$

However, due to the dual-port RAM, the circuit area of the FFT device 10 is still large and needs to be further reduced to meet with the miniaturization requirement. Therefore, it is desirable to provide an improved device to mitigate and/or obviate the aforementioned problems.

SUMMARY OF THE INVENTION

The object of the invention is to provide a memory-based FFT device, which can reduce a required circuit area of the prior FFT device.

To achieve the object of the invention, a memory-based Fast Fourier Transform device is provided. The device includes a processor, multiple single port random access memory (RAM) units, a sequence value generator, a sequence value modifier, an address controller and multiple switches. The switches consist of multiple barrel shifters and multiple multiplexers. The sequence value modifier adjusts an output of the sequence value generator to generate an adjusted sequence value to the address controller for generating a write shift amount, a read shift amount, and a bank address. The switches are based on the read shift amount to read data to be processed from a single port RAM to the processor in order to perform an FFT, and on the write shift amount to write the data from the processor to a different single port RAM.

Other objects, advantages, and novel features of the invention will become more apparent from the following detailed description when taken in conjunction with the accompanying drawings.

DETAILED DESCRIPTION OF THE PREFERRED EMBODIMENT

Since a traditional memory 14 of an N-point FFT device 10 is implemented by dual port RAM banks, and a cell of each dual port RAM bank typically contains 16 transistors, in order to achieve the purpose of reducing the circuit area of the device 10, the invention replaces the dual port RAM banks with single port RAM banks, a cell of each single port RAM bank containing just about ten transistors. Thus, the circuit area is significantly reduced.

In this embodiment, the configuration of the present invention is the same with the traditional device 10 (N=64, r=4, R=3). However, the values of the configuration can be adjusted based on the demand of users.

Figure 4:
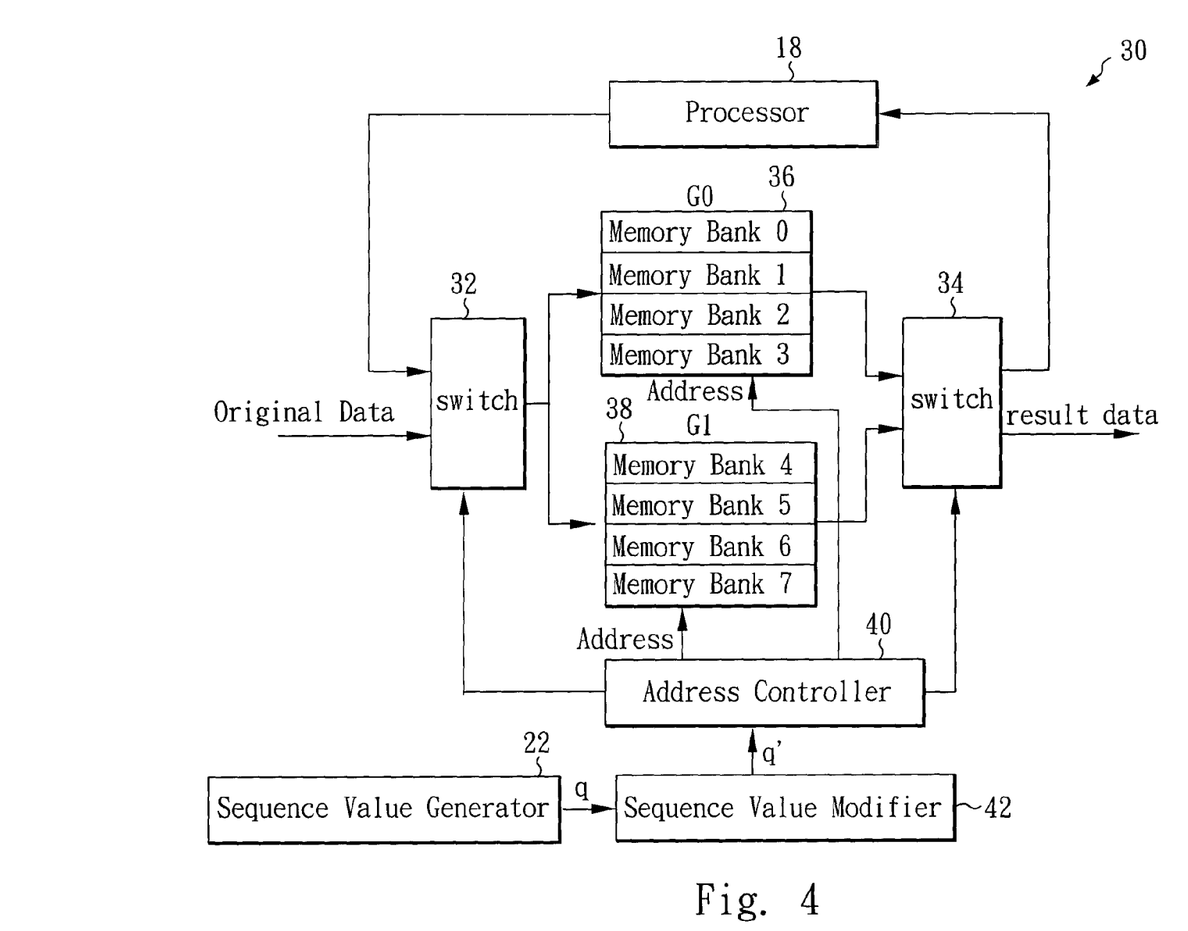
FIG. 4 is a block diagram of FFT device according to the invention.
Figure 5A:
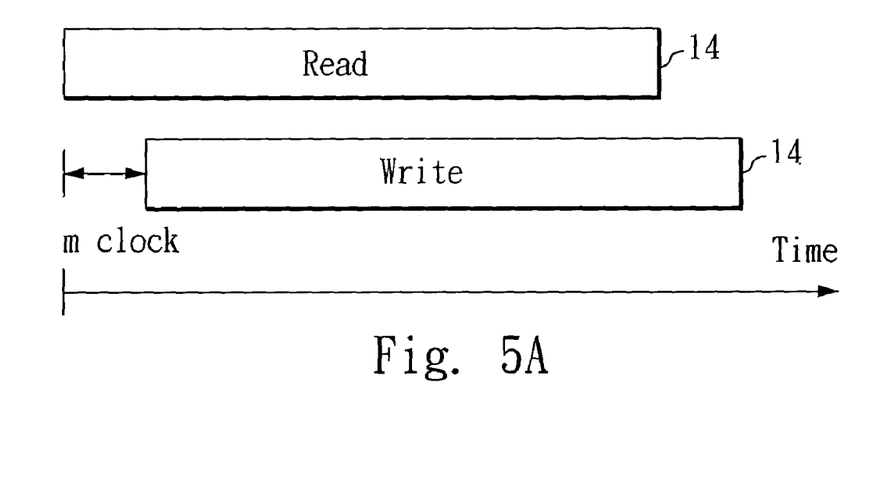
FIG. 5A is a timing diagram of a traditional access sequence of FIG. 1.
Figure 5B:
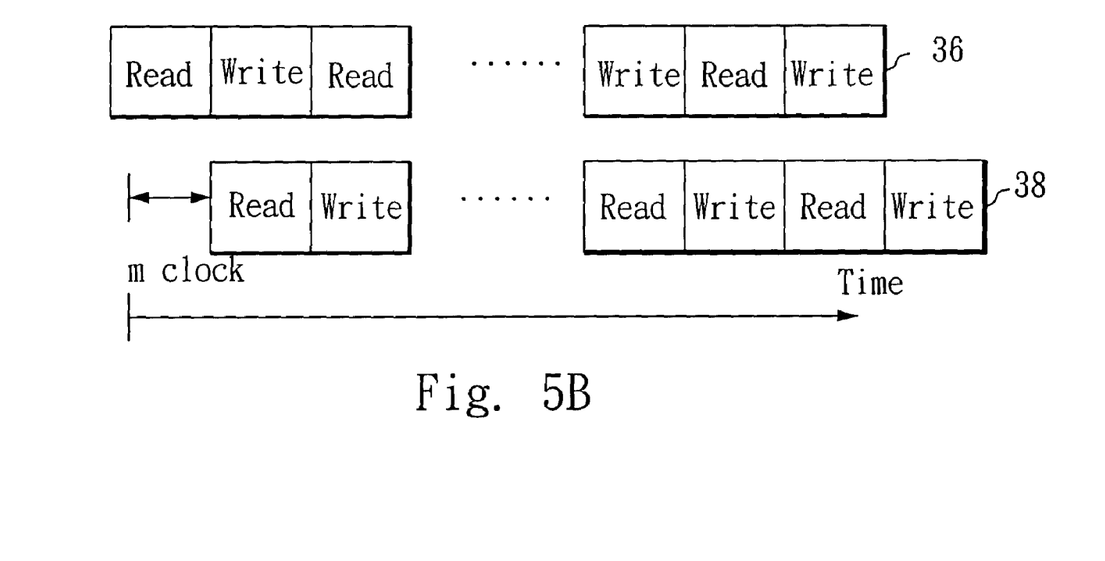
FIG. 5B is a timing diagram of an access sequence of FIG. 4 according to the invention.

As shown in FIG. 4, the FFT device 30 includes the processor 18, switches 32 and 34, memory units 36 and 38, an address controller 40, a sequence value modifier 42 and the sequence value generator 22, wherein the processor 18 and the sequence value generator 22 are identical to the prior processor and the sequence value generator 22 respectively and thus not repeated. The memory units 36 and 38 are memory units each consisting of four single port RAMs and alternately accessed by the processor 18. An operation of the dual port RAM banks of the traditional memory 14 is shown in FIG. 5A, which illustrates that the traditional memory 14 can concurrently perform write and read operations. Conversely, since the memory units 36 and 38 are memory units each consisting of four single port RAMs, in order to achieve the performance the same as that of the traditional memory 14 and avoid concurrently reading and writing in the same memory address, the memory units 36 and 38 are operated as shown in FIG. 5B. Namely, the memory units 36 and 38 respectively perform the alternate write and read operations. The processor 18 can read data from one of the memory unit 36 or 38 and write the processed data to the same memory unit. Since the FFT device 30 includes the memory units 36 and 38, a new addressing for the FFT device 30 is required so that the processed data can be stored in the appropriate memory addresses to thus provide the in-place and conflict-free features.

The addressing can directly divide the data into multiple groups. In this embodiment, to meet with the number of the adopted single port RAM, two groups are preferred, which are denoted as G0 and G1 and respectively stored in the memory units 36 and 38. The memory units 36 and 38 have four memory banks respectively numbered 0-3 and 4-7 as bank indexes. In this embodiment, it is preferred to equally divide the data from top to bottom. In this case, equation (3) can be rewritten as:

if $(n_{R-1} < r/2)$ $B(n) = (n_0 + n_1 + \ldots + n_{R-1}) \bmod r;$ else $B(n) = (n_0 + n_1 + \ldots + n_{R-1}) \bmod r + r;$  (9)

Equation (5) can be rewritten as:

if $(n_{R-1} < r/2)$ $A(n) = n_1 \cdot r^0 + n_2 \cdot r^1 + \ldots + n_{R-1} \cdot r^{R-2};$ else $$A(n) = n_1 \cdot r^0 + n_2 \cdot r^1 + \ldots + n_{R-1} \cdot r^{R-2} - \frac{N}{2r}.$$  (10)

According to memory bank indexes B(n) obtained in equation (9) and address values A(n) of memory cells obtained in equation (10), the address controller 40 can control the operation of store and write of the processed data.

The sequence value modifier 42 can adjust a sequence value q output by the sequence value generator 22 and generate a new sequence value q'. The address controller 40 controls operations of the switches 32 and 34 according to the new sequence value q' and further controls a processing flow of data to be processed.

Figure 6:
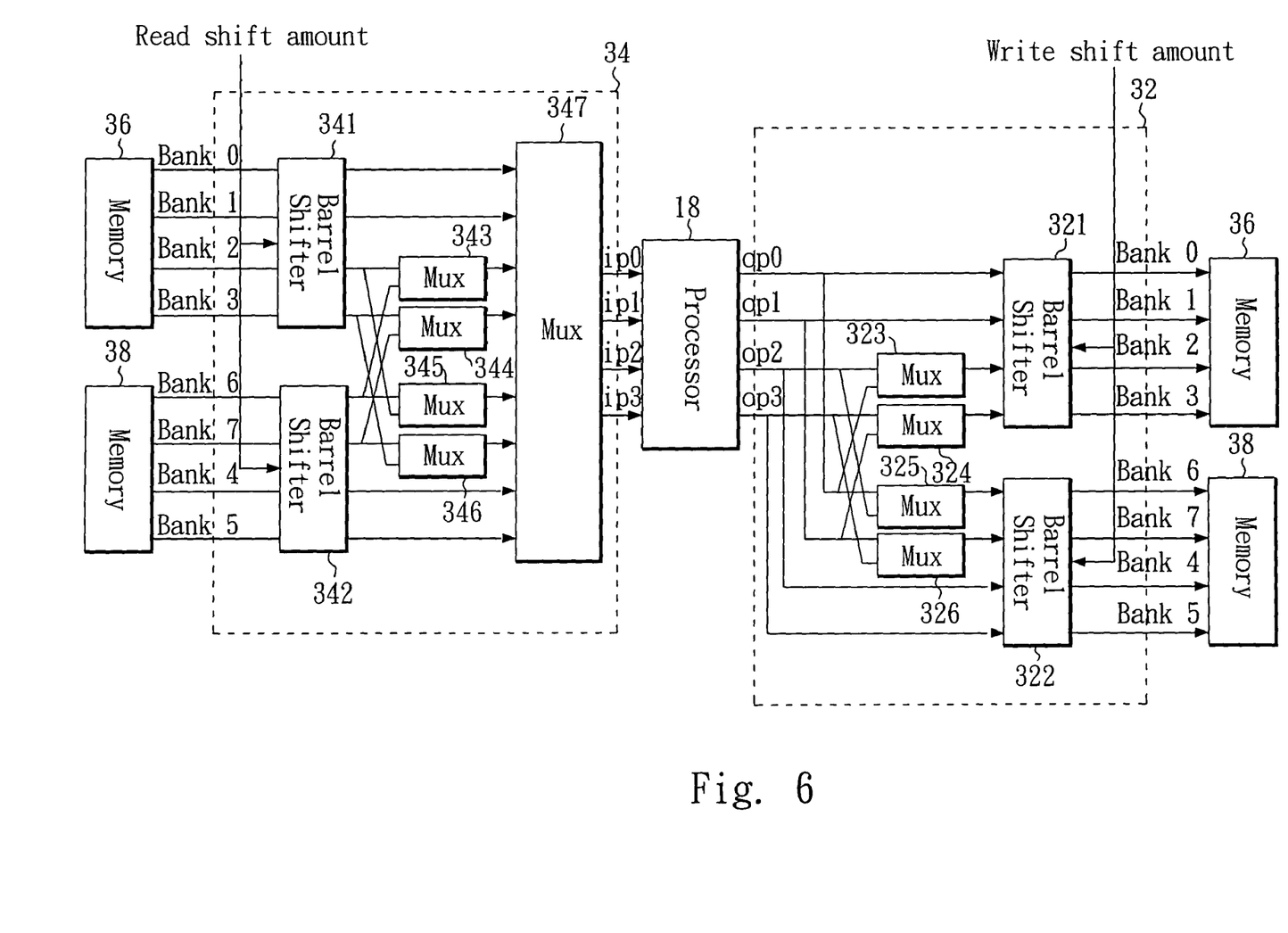
FIG. 6 is a block diagram of switches and a process according to the invention.

As shown in FIG. 6, the switch 32 includes barrel shifters 321 and 322, and multiplexers 323-326. The processor 18 has four output terminals, two, op0 and op1, connected directly to two input terminals of the barrel shifter 321 and the other two, op2 and op3, connected directly to two input terminals of the barrel shifter 322. In addition, the two output terminals of the processor 18, op0 and op1, are also connected to the other two input terminals respectively of the barrel shifters 322 through the multiplexers 325 and 326 respectively, and the other two, op2 and op3, are also connected to the other two input terminals respectively of the barrel shifters 321 through the multiplexers 323 and 324 respectively. The four output terminals of the barrel shifters 321 and 322 are connected to four input terminals of the memory units 36 and 38 respectively, one to one. The switch 34 includes barrel shifters 341 and 342, and multiplexers 343-347. The barrel shifters 341 and 342 have four input terminals connected to output terminals of the memory units 36 and 38 respectively, one to one. The multiplexer 347 has eight input terminals, two connected to two output terminals of the barrel shifter 341, two connected to the other two output terminals of the barrel shifter 341 through the multiplexers 343 and 344 respectively, two connected to two output terminals of the barrel shifter 342, and two connected to the other two output terminals of the barrel shifter 342 through the multiplexers 345 and 346 respectively. The multiplexers 343 and 344 each have a different input terminal connected to the other two output terminals of the barrel shifter 342 respectively. The multiplexers 345 and 346 each have a different input terminal connected to the other two output terminals of the barrel shifter 341 respectively. The processor 18 has four input terminals connected to four output terminals of the multiplexer 347, one to one.

The barrel shifters 341, 342 and 321, 322 can shift data to be processed according to a read shift amount and write shift amount respectively. The processor 18 reads or writes data to be processed from or to the memory units 36 and 38 at operation. Thus, the switches 32 and 34 internally require the multiplexers 323-326 and 343-346 to provide the processor 18 with appropriate data to be processed. The operations of the multiplexers 323-326 and 343-346 are controlled by the address controller 40. The multiplexer 347 selects input data for processor 18 from upper or lower four input terminals.

Figure 7:
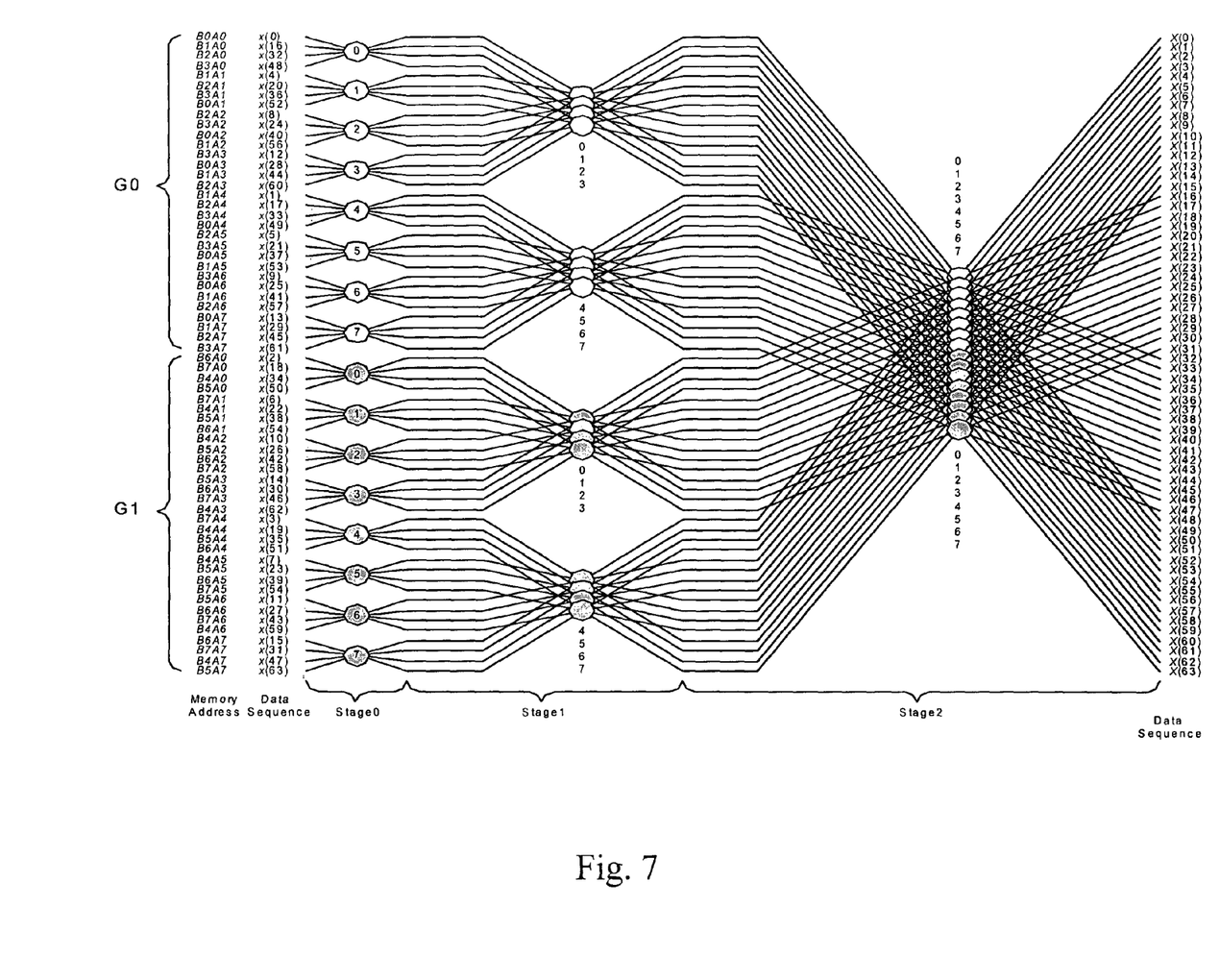
FIG. 7 is a data flow graph of FFT with a processing sequence and operation of FIG. 4 according to the invention.

FIG. 5B also indicates that the processing sequence of the processor 18 will be different from the prior art. As shown in FIG. 7, a butterfly symbol indicates a processor 18, and numbers on or near the butterflies indicate the operation sequence of the process 18. Because the memory units 36 and 38 are alternately accessed by the processor 18, the operation sequence can be counted separately. Similarly, the 48 operations can be divided into three stages (stage0, stage1, stage2), each having the 16 operations. Because the processor 18 requires m clocks for the operations, an m clock interval between the operations is preferred, thereby reading from or writing to the memory units 36 and 38 alternately.

Figure 8:
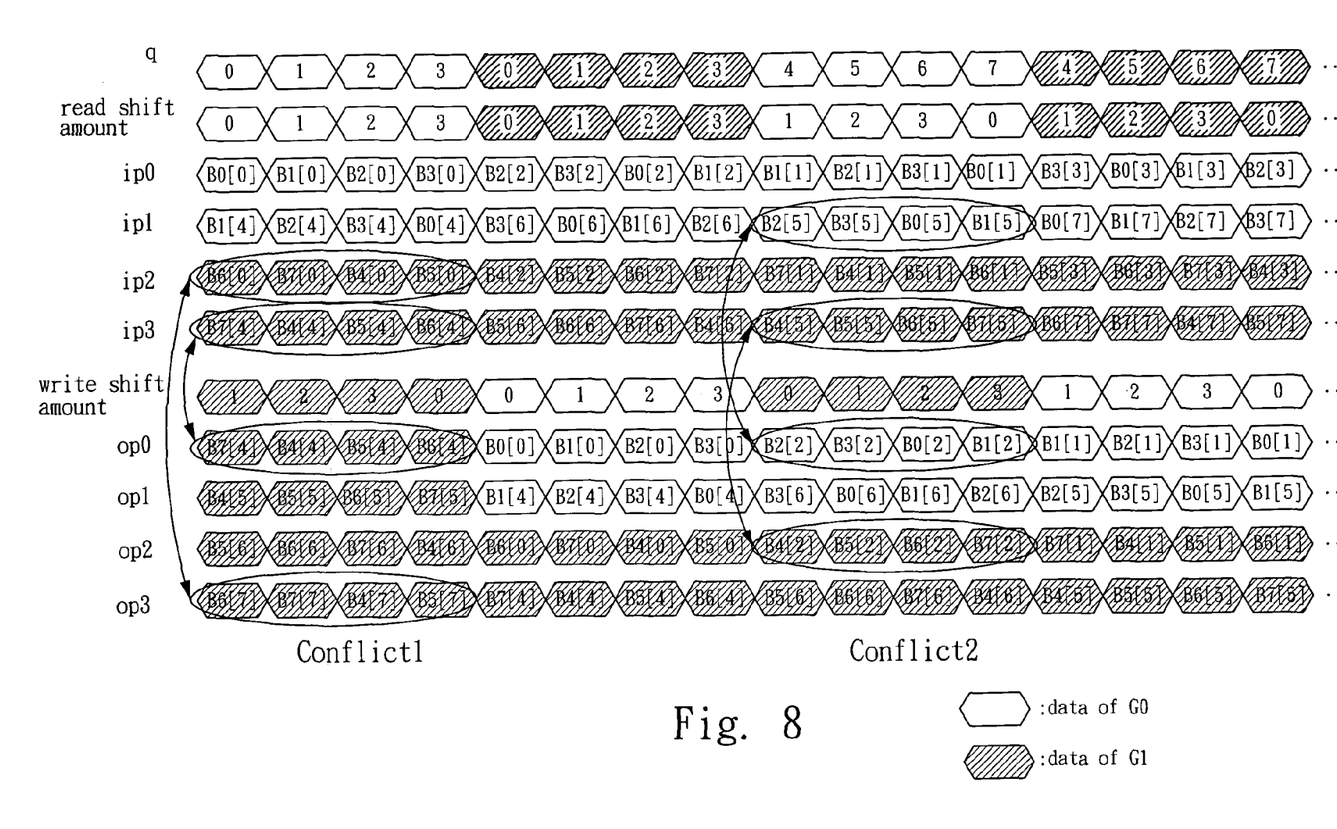
FIG. 8 is a schematic diagram of a read and write operation with collisions 1 and 2 according to the invention.
Figure 9:
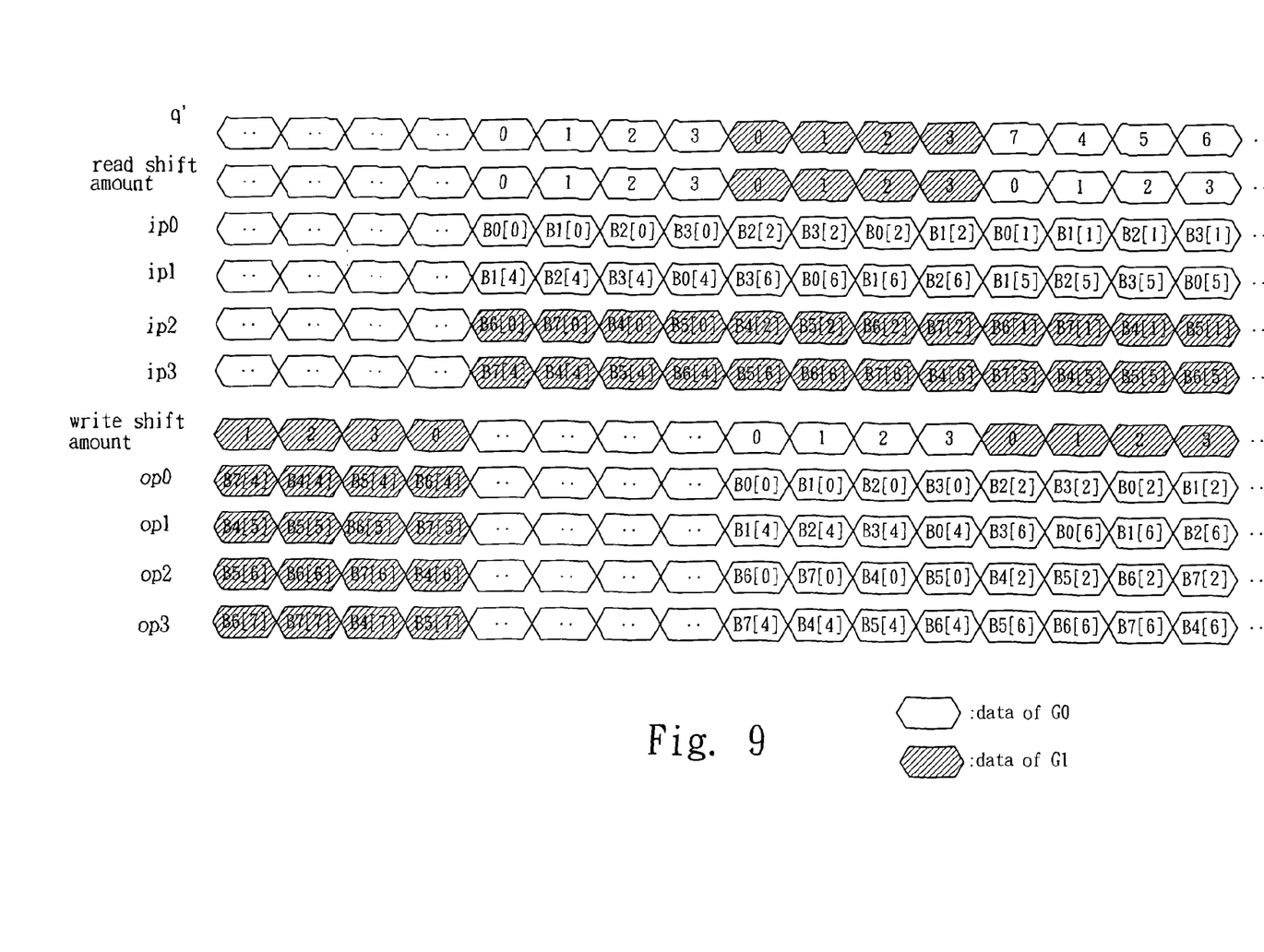
FIG. 9 is a schematic diagram of FIG. 8 after collisions 1 and 2 are eliminated according to the invention.

After the addressing method is established completely, the processor 18 is further checked for accessing appropriate data to be processed according to the addressing method. At stage0 and stage1, because the processor 18 reads and stores data to be processed in different memory groups, memory 36 and 38, data to be processed in a same memory bank are not read and written concurrently. Thus, no data access conflict occurs. However, at stage2, the processor 18 reads and writes data to be processed in a same memory bank and therefore data access conflicts occur. As shown in FIG. 8, based on the condition of conflict, the data access conflict can have two types, referred to as conflict1 and conflict2. Conflict1 is caused when the processor 18 needs to read a data to be processed from the memory 38 while the data is written to the memory 38. Conflict1 can be eliminated by inserting a wait state before the last operation at stage1 and the delay time preferably equals to a period of m clocks. The result is shown in FIG. 9 and the conflict1 is avoided.

Conflict 2 is to be eliminated after conflict1 is eliminated. However, conflict 2 could not be eliminated by the same way, but if the write shift amount equals to the read shift amount, the processor 18 can conveniently read and write data to be processed so as to eliminate conflict2. Accordingly, the sequence values q are adjusted to generate adjusted sequence values q' such that the write shift number equals to the read shift amount, thereby eliminating conflict2. First, every four adjacent sequence values q generated by the sequence value generator 22 are grouped into a natural sequence. In this case, for q=0 to 15, four natural sequences {0, 1, 2, 3}, {4, 5, 6, 7}, {8, 9, 10, 11} and {12, 13, 14, 15} are grouped, as shown in Table 1. For the natural sequence {0, 1, 2, 3}, its shift amount is equal to {0, 1, 2, 3} and thus no adjustment is performed. For the natural sequence {4, 5, 6, 7}, its shift amount sequence is equal to {1, 2, 3, 0} and thus the natural sequence {4, 5, 6, 7} needs an adjustment in order to conform to {0, 1, 2, 3}. Accordingly, "7" is sent out first and then {4, 5, 6} is sent out, thereby forming an adjusted sequence {s3, s0, s1, s2} and an adjusted natural sequence {7, 4, 5, 6}. Similarly, for the shift amount sequences {2,3,0,1} and {1,2,3,0}, the adjusted sequences are {s2, s3, s0, s1} and {s1, s2, s3, s0} respectively. At this point, the shift amount sequences corresponding to the four natural sequences are {0, 1, 2, 3}, {1, 2, 3, 0}, {2, 3, 0, 1} and {3, 0, 1, 2} respectively. A relation between the shift amount and the bank index is shown in Table 2, and one of the barrel shifters corresponds to the barrel shifter 341 or 321 while the other corresponds to the barrel shifter 342 or 322.

TABLE 1

| Natural sequence s0, s1, s2, s3 | Shift amount j0, j1, j2, j3 | Adjusted sequence | Adjusted natural Sequence s0', s1', s2', s3' |
|---|---|---|---|
| 0, 1, 2, 3 | 0, 1, 2, 3 | s0, s1, s2, s3 | 0, 1, 2, 3 |
| 4, 5, 6, 7 | 1, 2, 3, 0 | s3, s0, s1, s2 | 7, 4, 5, 6 |
| 8, 9, 10, 11 | 2, 3, 0, 1 | s2, s3, s0, s1 | 10, 11, 8, 9 |
| 12, 13, 14, 15 | 3, 0, 1, 2 | s1, s2, s3, s0 | 13, 14, 15, 12 |

TABLE 2

| Shift amount | 0 | 1 | 2 | 3 |
|---|---|---|---|---|
| One barrel shifter 341/321 | | | | |
| 0th input/output ports | B0 | B1 | B2 | B3 |
| 1st input/output ports | B1 | B2 | B3 | B0 |
| 2nd input/output ports | B6 | B7 | B4 | B5 |
| 3rd input/output ports | B7 | B4 | B5 | B6 |
| The other barrel shifter 342/322 | | | | |
| 0th input/output ports | B2 | B3 | B0 | B1 |
| 1st input/output ports | B3 | B0 | B1 | B2 |
| 2nd input/output ports | B4 | B5 | B6 | B7 |
| 3rd input/output ports | B5 | B6 | B7 | B4 |

There are only four possibilities, and thus a user needs to detect a value of the first element $j_0$ of a shift amount sequence to accordingly obtain all values of the shift amount sequence. The value of the first element $j_0$ can be obtained from the following equation.

$$j_0 = (q_{R-2} + q_{R-3} + \ldots + q_1) \bmod r. \quad (11)$$

When the value of the first element $j_0$ is obtained, the respective adjusted natural sequence can be obtained from the following function.

if (($j_0$==0) or ($j_0$==2))

$s_i' = s_{j_i};$ else $$s_i' = s_{(j_i+2) \bmod 4}; \quad (12)$$

Figure 10:
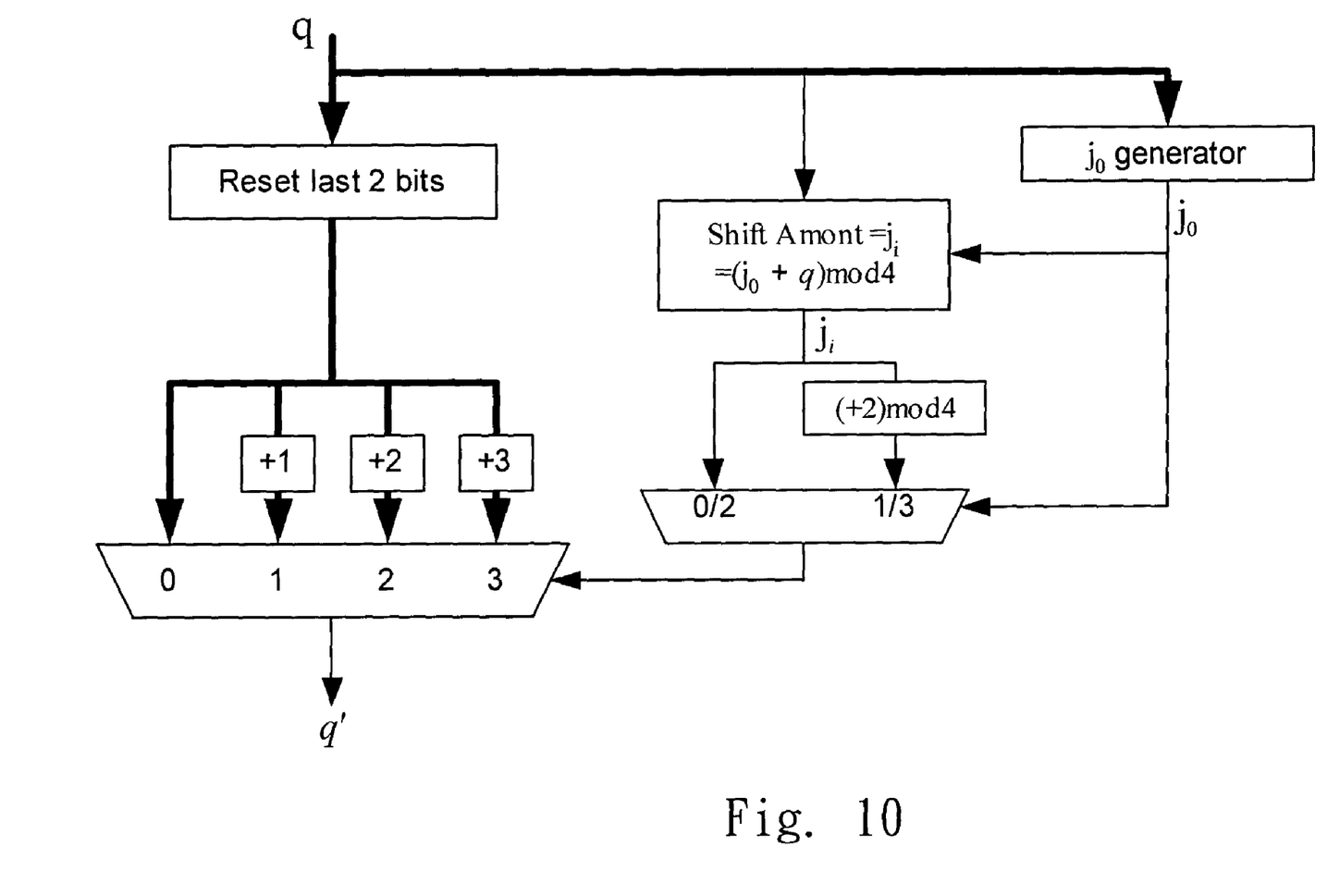
FIG. 10 is a schematic diagram of a sequence value modifier according to the invention.

As shown in FIG. 10, the sequence value modifier 42 is a physical circuit corresponding to equation (11) and function (12). Accordingly, the write and read shift amounts corresponding to an adjusted natural sequence are the same, thereby eliminating conflict2. Because of no conflict at stage0 and stage1, when the way of eliminating conflict2 is submitted to stage0 and stage1, the operation of the processor 18 is affected. In order to eliminate conflict 1, the time required by the FFT device 30 to complete an FFT is m clocks more than that by the traditional FFT device 10, but no additional time is required by the FFT device 30 in eliminating conflict2. Accordingly, the time required by the FFT device 30 to complete the FFT can be represented by the following equation.

$$\left(\frac{N}{r} \cdot \log_r N\right) + 2m \quad (13)$$

As shown in Table 3, although the FFT device 30 needs additional electronic components, it can save almost a half of memory space of the traditional FFT device 10 with a dual port RAM, and accordingly the effect of area reduction is achieved. The FFT device 30 requires additional m clock for operation, but with N becoming greater and greater, the m clock delay can be relatively small and be ignored to thus have the performance similar to that of the traditional FFT device 10.

TABLE 3

| | Traditional FFT device | FFT device of the present invention |
|---|---|---|
| Processor number | 1 | 1 |
| Memory size | N-cword* dual-port RAM | N-cword* single port RAM |
| Switch structure | Two barrel shifters | Four barrel shifters and eight multiplexers |
| Sequence value provider | Sequence value generator | Sequence value generator and sequence value modifier |
| Time for operation | $\left(\frac{N}{r} \cdot \log_r N\right) + m$ | $\left(\frac{N}{r} \cdot \log_r N\right) + 2m$ |

(*: cword means a complex word)

Although the present invention has been explained in relation to its preferred embodiment, it is to be understood that many other possible modifications and variations can be made without departing from the spirit and scope of the invention as hereinafter claimed.

What is claimed is:

1. A memory-based Fast Fourier Transform (FFT) device, comprising:
a processor;
a plurality of single port random access memory (RAM) units for storing data;
a sequence value generator for providing a sequence value;
a sequence value modifier for adjusting the sequence value and outputting an adjusted sequence value;
an address controller, which generates a write shift amount and a read shift amount according to the adjusted sequence value and generates bank addresses for memory banks; and
a plurality of switches, which reads the data to be processed from one of the single port RAM units to the processor according to the write shift amount in order to perform a Fast Fourier Transform, and writes the data to be processed from the processor to another of the single port RAM units according to the read shift amount, wherein the number of the single port RAM units is two, and the data to be processed uses a bank index B(n) and an address value A(n) of memory cells to indicate memory addresses, where B(n) is implemented as:
if ($n_{R-1} < r/2$)

$B(n) = (n_0 + n_1 + \ldots + n_{R-1}) \bmod r;$ else $B(n) = (n_0 + n_1 + \ldots + n_{R-1}) \bmod r + r;$ and A(n) is implemented as:
if $(n_{R-1} < r/2)$ $$A(n) = n_1 \cdot r^0 + n_2 \cdot r^1 + \ldots + n_{R-1} \cdot r^{R-2};$$

else $$A(n) = n_1 \cdot r^0 + n_2 \cdot r^1 + \ldots + n_{R-1} \cdot r^{R-2} - \frac{N}{2r};$$

where $R = \log_r N$, N is a total number of the data to be processed, r is a number of data input ports of the processor, and n is indexes of the data to be processed.

2. The device as claimed in claim 1, wherein the write and the read shift amounts are the same.

3. The device as claimed in claim 1, wherein the processor comprises a plurality of processing stages, and an m clock waiting time is inserted into the processing stages.

4. The device as claimed in claim 1, wherein each switch comprises a plurality of barrel shifters and a plurality of multiplexers.

5. The device as claimed in claim 1, wherein a number of successive sequence values are grouped into a natural sequence corresponding to a shift amount sequence, the first element $j_0$ of the shift amount sequence has a value represented by:

$$j_0 = (q_{R-2} + q_{R-3} + \ldots + q_1) \bmod r;$$

where q is the sequence value, $R = \log_r N$, N is a total number of the data to be processed, r is a number of data input ports of the processor, and n is indexes of the data to be processed, and an adjusted sequence s' with respect to the adjusted sequence value is implemented as:
if $((j_0 == 0)$ or $(j_0 == 2))$ $$s_i' = s_{j_i}; \text{ else}$$

$$s_i' = s_{(j_i + 2) \bmod 4};$$

where i indicates an element number of the natural sequence, j indicates an element number of the shift amount sequence, and S indicates the natural sequence.

6. The device as claimed in claim 1, wherein a total clock number of operations by the FFT device is indicated by equation:

$$\left(\frac{N}{r} \cdot \log_r N\right) + 2m$$

where N is a total number of the data to be processed, r is a number of data input ports of the processor, and m is a duration of an operation completed by the processor.

7. A memory-based Fast Fourier Transform (FFT) device, comprising:
a processor;
two memory units each containing 4 banks of single port random access memory for storing data;
a sequence value generator for providing a sequence value;
a sequence value modifier for adjusting the sequence value and outputting an adjusted sequence value;
an address controller, which generates a write shift amount and a read shift amount according to the adjusted sequence value and generates bank addresses for memory banks;
a read switch for reading the data to be processed from one of the single port RAM units to the processor according to the read shift amount in order to perform a Fast Fourier Transform, the read switch comprising a first barrel shifter connected to one of the single port RAM units, a second barrel shifter connected to the other of the single port RAM units, a first multiplexer with a first input terminal connected to the first barrel shifter, a second multiplexer with a first input terminal connected to the first barrel shifter, a third multiplexer with a first terminal connected to the second barrel shifter and a second input terminal of the first multiplexer and with a second terminal connected to the first input terminal of the first multiplexer, a fourth multiplexer with a first input terminal connected to the second barrel shifter and a second input terminal of the second multiplexer and with a second input terminal connected to the first input terminal of the second multiplexer, and a fifth multiplexer connected to the two barrel shifter and the first to the fourth multiplexers; and
a write switch for writing the data to be processed from the processor to the other of the single port RAM units according to the write shift amount.

8. The device as claimed in claim 7, wherein the write switch comprises:
a first multiplexer with a first input terminal connected to the processor;
a second multiplexer with a first input terminal connected to the processor;
a third multiplexer with a first input terminal connected to the processor and a second input terminal of the first multiplexer and with a second input terminal connected to the first input terminal of the first multiplexer;
a fourth multiplexer with a first input terminal connected to the processor and a second input terminal of the second multiplexer and with a second input terminal connected to the first input terminal of the second multiplexer;
a first barrel shifter with a first input terminal connected to the processor and the first input terminal of the third multiplexer, a second input terminal connected to the processor and the first input terminal of the fourth multiplexer, a third input terminal connected to an output terminal of the first multiplexer and a fourth input terminal connected to an output terminal of the second multiplexer; and
a second barrel shifter with a first input terminal connected to an output terminal of the third multiplexer, a second input terminal connected to an output terminal of the fourth multiplexer, a third input terminal connected to the processor and the first input terminal of the first multiplexer and a fourth input terminal connected to the processor and the first input terminal of the second multiplexer.

9. The device as claimed in claim 8, wherein the data to be processed uses a bank index B(n) and an address value A(n) of memory cells to indicate memory addresses, where B(n) is implemented as:
if $(n_{R-1} < r/2)$ $$B(n) = (n_0 + n_1 + \ldots + n_{R-1}) \bmod r;$$

else $$B(n) = (n_0 + n_1 + \ldots + n_{R-1}) \bmod r + r;$$

and A(n) is implemented as:
if $(n_{R-1} < r/2)$ $$A(n) = n_1 \cdot r^0 + n_2 \cdot r^1 + \ldots + n_{R-1} \cdot r^{R-2};$$

else $$A(n) = n_1 \cdot r^0 + n_2 \cdot r^1 + \ldots + n_{R-1} \cdot r^{R-2} - \frac{N}{2r};$$

where $R=\log_r N$, N is a total number of the data to be processed, r is a number of data input ports of the processor, and n is indexes of the data to be processed.

10. The device as claimed in claim 8, wherein a number of successive sequence values are grouped into a natural sequence corresponding to a shift amount sequence, the first element $j_0$ of the shift amount sequence has a value represented by:

$j_0 = (q_{R-2} + q_{R-3} + \ldots + q_1) \bmod r;$ where q is the sequence value, $R=\log_r N$, N is a total number of the data to be processed, r is a number of data input ports of the processor, and n is indexes of the data to be processed, and an adjusted sequence s' with respect to the adjusted sequence value is implemented as:

if $((j_0==0)$ or $(j_0==2))$ $s_i' = s_{j_i}$; else $s_i' = s_{(j_i+2) \bmod 4};$ where i indicates an element number of the natural sequence, j indicates an element number of the shift amount sequence, and S indicates the natural sequence.

11. The device as claimed in claim 8, wherein a total clock number of operations by the FFT device is indicated by equation:

$$\left(\frac{N}{r} \cdot \log_r N\right) + 2m$$

where N is a total number of the data to be processed, r is a number of data input ports of the processor, and m is a duration of an operation completed by the processor.

* * * * *